United States Patent
Magolan et al.

(10) Patent No.: US 6,609,156 B1
(45) Date of Patent: Aug. 19, 2003

(54) METHOD AND APPARATUS FOR REDUCING REDUNDANT MULTIPLE RECIPIENT MESSAGE HANDLING IN A MESSAGE HANDLING SYSTEM

(75) Inventors: John F. Magolan, Phoenixville, PA (US); Daniel P. Meyer, Downingtown, PA (US); Walter T. Fink, Downingtown, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/473,552

(22) Filed: Dec. 29, 1999

(51) Int. Cl.[7] ............................................... G06F 13/00
(52) U.S. Cl. ........................ 709/232; 709/230; 709/206
(58) Field of Search ................................. 709/206, 232, 709/230; 707/1, 10, 100, 103 R (56) References Cited

U.S. PATENT DOCUMENTS

| | | | |
|---|---|---|---|
| 5,278,955 A | | 1/1994 | Forté et al. ................. 709/206 |
| 5,459,717 A | | 10/1995 | Mullan et al. .............. 370/351 |
| 5,493,564 A | | 2/1996 | Mullan ....................... 370/351 |
| 5,577,202 A | | 11/1996 | Padgett ....................... 709/206 |
| 5,794,039 A | * | 8/1998 | Guck ...................... 707/103 R |
| 5,822,526 A | * | 10/1998 | Waskiewicz ................ 709/206 |
| 5,848,415 A | * | 12/1998 | Guck ........................... 707/10 |
| 5,893,099 A | | 4/1999 | Schreiber et al. ............. 707/10 |
| 5,911,776 A | * | 6/1999 | Guck ........................ 709/217 |
| 5,940,823 A | | 8/1999 | Schreiber et al. .............. 707/3 |
| 6,101,320 A | * | 8/2000 | Schuetze et al. ............ 709/206 |
| 6,212,550 B1 | * | 4/2001 | Segur .......................... 709/206 |

* cited by examiner

Primary Examiner—Kenneth R. Coulter
(74) Attorney, Agent, or Firm—Lise A. Rode; Mark T. Starr; Woodcock Washburn LLP (57) ABSTRACT

An improved storage method that maximizes efficiency and removes redundancy for a computing system maintaining a message handle system (MHS). For example, a MHS that is in accordance with the X.400 message handle system (MHS) standard. The X.400 MHS processes messages on a recipient basis, that is, the message is processed once for each recipient listed on a message. Such processing is inefficient and redundant, placing a toll on overall system processing. Such inefficiencies are even more apparent in the case of multiple recipient messages that require translation. In such event the message is translated and routed for each of the recipients listed. The improved storage system and method alleviates this redundancy and inefficiency. In the event a multiple recipient message requiring translation is routed over a X.400 MHS, the components of the X.400 MHS cooperate such that the message is translated, transferred, and stored in the X.400 MHS component requiring translated messages. The X.400 MHS component subsequently creates a unique and persistent message identifier that is associated with the translated message and is communicated to cooperating MHS components. When another message recipient is identified as requiring translation as part of message processing, the X.400 MHS components, requiring translation, utilize the translated message's message identifier to retrieve the stored translated message for use.

26 Claims, 5 Drawing Sheets

METHOD AND APPARATUS FOR REDUCING REDUNDANT MULTIPLE RECIPIENT MESSAGE HANDLING IN A MESSAGE HANDLING SYSTEM

FIELD OF THE INVENTION

The present invention relates generally to message handling systems (MHS) and more particularly to a message storage method for a MHS that handles multiple recipient messages.

BACKGROUND OF THE INVENTION

The electronic transfer of message data has proven to be a vital means of communication for the both consumers and businesses. It has many advantages over conventional methods, such as mail and telephone. Such advantages include timely, efficient, and secure delivery of information between cooperating parties. As a result, a number of message handling systems have been developed to meet the needs of electronic message transfer for various categories of users. For example, one message handling system used in the United States is known as E-mail. An international message handling system, commonly used in Europe, is known as the International Standards Organization (ISO) Advanced Communications System (ADCOMMS) X.400 message handling system.

Specifically, X.400 is a broad-based messaging standard which includes E-mail facilities. It has considerable advantages over many other E-mail messaging systems as messages can be transferred within the same format in which they were created. X.400 can also be used to transfer EDI (electronic data interchange) information, and to send and receive messages on the Internet. The standard has several inbuilt security features. These features include identity authentication, protection against message modification, and protection of messages against unauthorized disclosure.

Using X.400 based services, it is possible to send electronic messages to internal corporate desktop users, to other X.400 users and to subscribers connected to the Internet, including most E-mail systems. In an X.400 message handling system, X.400 messages are carried with "envelopes." The messages themselves can be of many different kinds including text files, spreadsheets, databases or even video images. Basically, anything which is created using a computer can be sent as an X.400 message. Thus the X.400 standard can be used to exchange a wide variety of information. For example, contract proposals, requests for information, price lists, CAD documents, spreadsheets, purchase orders and invoices can be exchanged with the X.400 standard.

Additionally X.400 has two key features not found in other message handling systems. The X.400 message preserves the format of the application within which it was created. A spreadsheet document, for example, can be edited by its recipient without the need for any manipulation or transformation beforehand. A second feature of the X.400 standard is the audit trail that it incorporates. The sender is notified whether and when a message was delivered, and when the envelope was opened. The audit trail does not require both the sender and the recipient to use the same X.400 service.

However, such as in the X.400 MHS, there are some drawbacks that are inherent in message handling systems. That is, certain message handling systems are required to perform redundant processing when handling messages having multiple recipients. By way of example, the X:400 standard provides that a message is processed on a recipient basis. That is, when a message is handled in the X.400 MHS, the X.400 MHS will process the message once for each of the recipients listed. This processing inefficiency of the X.400 standard is tolerated given the aforementioned inbuilt security features offered by the X.400 standard. However, this processing drawback becomes very expensive when a multiple recipient message requiring translation is handled by the X.400 MHS. In such a scenario, current X.400 MHS processing dictates that the message be translated and transferred for each of the recipients processed. This results in redundant translation and transfer of the same message, which is extremely inefficient.

It would thus be advantageous to provide a system and method that would increase processing efficiency and remove redundancy for messages processed in a MHS. This would allow a MHS to perform a single translation and a single transfer for multiple recipient messages being routed to MHS components that require translation.

SUMMARY OF THE INVENTION

The present invention provides a message storage system for use in a message handling system (MHS) which increases processing efficiency and removes operation redundancy for messages having multiple recipients. For example, in an X.400 MHS, the X.400 MHS processes messages on a recipient basis, that is, the message is processed once for each of the listed recipients. In addition, as part of X.400 MHS component processing, messages cooperating with certain MHS components may require translation from a first message format to a second message format.

When processing multiple recipient messages requiring translation, an MHS may translate the message from a first message format to a second message format. A copy of the translated message is stored local to the MHS component responsible for receiving and routing messages. The X.400 MHS reads the received message recipient to demarcate those recipients that require translation from those that do not. The MHS may first process those recipients that do not require translation. The recipients that do require translation are processed such that the translated message is transferred to the intended cooperating MHS component associated with the first listed recipient requiring translation. The cooperating MHS component receives the transferred message and stores it in a local database to which the MHS component is coupled. The cooperating MHS component creates unique and persistent message identifier, associates the message identifier with the received translated message, stores the message identifier in the database and communicates the message identifier back to the MHS component that performed the translation. When the translating MHS component comes across the next listed recipient requiring translation, the translating MHS component communicates information about the next listed recipient along with the message identifier to the intended cooperating MHS component associated with the next listed recipient. The cooperating MHS component receives the information about the next listed recipient along with the message identifier and uses the message identifier to retrieve the translated message from its database. The cooperating MHS component creates an association with the next listed recipient of the translated message and stores the association in the database.

Other aspects of the present invention are described below.

BRIEF DESCRIPTION OF THE DRAWINGS

A presently preferred implementation of the improved storage method for a message handling system (MHS) in accordance with the present invention is further described with reference to the accompanying drawings in which.

DETAILED DESCRIPTION OF PREFERRED EMBODIMENTS

X.400 Message Handling System Overview

X.400 is a set of international standards that describes a message handling system (MHS). A X.400 MHS utilizes common message delivery components to facilitate message transfer. According to the X.400 standards, a Message Transfer Agent (MTA) is responsible for sending, receiving, and routing messages to local message recipients. The MTA may receive messages from other MTAs. Additionally, the MTA may interface with one or more User Agents (UA) to realize message delivery. In turn, the UAs are responsible for delivery of the message to specific recipients.

Moreover, X.413 is part of the X.400 set of message handling standards. X.413 introduces the concept of a message store (MS) that, like UA, is responsible for contacting recipients of an electronic message. The MS has an attached database in which it stores messages that are to be forwarded to specified recipients. In general terms, an MS may be considered a specific implementation of a user agent. However, unlike a regular UA, an MS can only route messages having an MS specific message format. As such, message format translations must be undertaken by non-MS MHS components to perform message routing to and from an MS.

Generally, the MS may be used in situations where messages need to be stored for future use. For example, an MS may be used in conjunction with an e-mail application (for example, a Remote User Agent (RUA)) residing on a recipient's personal computer. When an E-mail is targeted for a specific recipient, the E-mail (or any other electronic message) is delivered to the MS where it is stored and associated with the processed recipient until the recipient decides to retrieve the message. The message may be retrieved from the MS through various constructs, such as, a PC E-mail application.

As mentioned briefly, message routing between components of an X.400 series MHS is facilitated through the use of message formats. The type of format used depends on which MHS component is processing the message. For example, messages which are routed between MTAs (i.e. messages that one MTA routes to another) are formatted in accordance with a P1 protocol as described by the X.400 standard. UAs, on the other hand, may be able to route messages having either the P1 or P3 format. Comparatively, messages which are routed between an MTA and an MS must be formatted in accordance with the P3 protocol.

Hence, an MTA may communicate with a UA in the P1 format. However an MTA can not communicate with an MS unless the P1 formatted message is translated into the P3 format. Thus, to use the MS, an MTA should be capable of translating a received message from the P1 format into the P3 format. By doing so, an MS may able to receive, process and store messages from an MTA.

In the context of a message delivered to a single recipient, the required X.400 translations do not present significant problems. However, a disadvantage is recognized when the X.400 MHS processes a message having multiple recipients. In such event, the MTA is required to translate and transmit the message to the appropriate UA or MS for each message recipient listed. That is, the MTA is required to translate the P1 formatted message to the P3 format and then transmit the P3 message to the UA or MS for each recipient listed in the message. This results in an undesirable redundancy of operation that effects the performance and efficiency of the X.400 MHS. It would thus be advantageous to provide a method and apparatus utilizing the X.400 standard that requires a single translation of a message from P1 to P3 formats and correspondingly a single transfer of the translated message from a MTA to a MS or to a UA.

The present invention eliminates the redundancy that occurs under the X.400 standard when a message intended for multiple recipients is transferred between an MTA and an MS. The present invention provides an X.400 compliant MHS having an MTA, which cooperates with MHS components, some of which can access a database with indexing capabilities. The MTA translates the originally received message to P3 message format and transfers the P3 message to the MHS component. The cooperating MHS component stores the P3 message in its database according to a unique and persistent message identifier, and communicates the message identifier back to the MTA. Subsequently, the MTA uses the stored copy of the P3 message and the message identifier to satisfy future requests for the P3 formatted message.

By way of example, when a P1 formatted message, one intended for multiple recipients, is received by an MTA, the MTA processes the message to determine to which MHS components (i.e., other MTAs, UAs, or MS) the message is to be routed. The MTA reads through the message and identifies the intended recipients of the message. The MTA, using configuration information that includes the location of each recipient, proceeds to determine the actions necessary to realize delivery of the message to all of the listed recipients. If the recipient is local to the MTA (i.e. within the same network), the MTA creates a delivery action for each of the identified local recipients. If, however, the contrary is true, the MTA transfers a copy of the message to the remote MHS components responsible for delivery of the message to the identified remote recipients. That is, if there are 2 local recipients, and 3 remote recipients, the MTA would transfer a copy of the message to the remote MTAs or gateways responsible for the 3 mremote recipients.

The MTA created delivery action is linked to the P1 formatted message such that if the P1 formatted message is not properly delivered, the intended recipients may be notified of the failed delivery. In addition, the delivery action contains information indicating which MHS component is responsible for delivering the message. That is, the information identifies the MS or UA responsible for a given recipient. If a recipient is one that is associated with an MS, the delivery action is tagged accordingly and the MTA proceeds to translate the message into the P3 message format. The P3 translated message is stored temporarily within the MTA folder structure. In addition, the MTA creates a P3 action that is linked to the translated message. The P3 action is used in subsequent transfers of P3 translated messages that are delivered to additional recipients associated with the MS.

The MTA then proceeds to communicate with local MHS components to facilitate delivery of the message. For example, if the first recipient of the multiple recipient message is associated to a UA, the MTA communicates with the UA to indicate that the MTA has been directed to deliver a message to a recipient for which the UA is responsible. The UA communicates back to the MTA to request the transfer of the message for the determined recipient. The MTA transfers the message to the UA and the UA processes the message in accordance to message process delivery operations.

Similarly, if the first recipient of the multiple recipient message is associated to the MS, the MTA communicates with the MS to indicate that the MTA has been directed to deliver a message to a recipient for which the cooperating MS is responsible. The MS responds by requesting the transfer of the message. The MTA, recognizing that the recipient is associated to the MS, transfers the P3 formatted message. However, unlike UA message processing, the MS performs additional steps. The MS receives the translated P3 formatted message and stores it in its database for future use. In addition, the MS creates a unique and persistent message identifier and associates it with the stored P3 message and the recipient to whom the message is to be delivered. The message identifier is communicated back to the MTA where it is associated with the MTA created P3 action. The message is stored in the MS until all the recipients retrieve the message and subsequently request the message be deleted from the database.

Accordingly, the MTA continues to process each recipient listed in the multiple-recipient message. When a second recipient is identified as being a MS recipient, the MTA once again communicates to the MS that is has been directed to deliver a message to a recipient for which the communicated MS is responsible. In this communication, the MTA, in addition, transfers the MS created unique message identifier. The MS recognizes that a P3 message is to be delivered to a second recipient and proceeds to retrieve the stored P3 message from its database using the previously created message identifier. The MS then associates this message with the second recipient. The database still contains one copy of the message, now associated with both the first and second recipient. The P3 message will remain in the MS until all of the intended recipients of this indexed stored P3 message have retrieved it and have requested that it be deleted. The MTA continues to process the message for all of the listed recipients until the list has been exhausted. Once exhausted, the MTA deletes its temporary copy of the P3 formatted message.

Because the present invention eliminates much of the redundant processing and transmission associated with multiple-recipient messages, it improves the performance and efficiency of the X.400 message handling system. Also, the present invention reduces the chance that a P3 message transmission between the MTA and the MS may be interrupted. These interruptions may be avoided given that when processing a multiple-recipient message, the message is transferred only once.

As will be described below with respect to FIGS. 1–4, the present invention is directed to a system and methods for improved message storage in a X.400 compliant message handling system. In accordance with a preferred embodiment thereof, the present invention comprises a system and method to maximize processing efficiency and eliminate redundancy of operation for components of a X.400 compliant message handling system when processing messages having multiple recipients requiring translation.

In one embodiment, described more fully hereinafter, the methods and apparatus of the present invention may be implemented as part of a computer system which maintains a message handling system. Although the depicted embodiment provides improved message storage for a computer system employing electronically interconnected computers having a particular configuration of message handling components in accordance with the X.400 MHS standard, those skilled in the art will appreciate that the inventive concepts described herein extend to various message handling systems having various component configurations with differing component types in varying arrangements.

System Implementation

Figure 1:
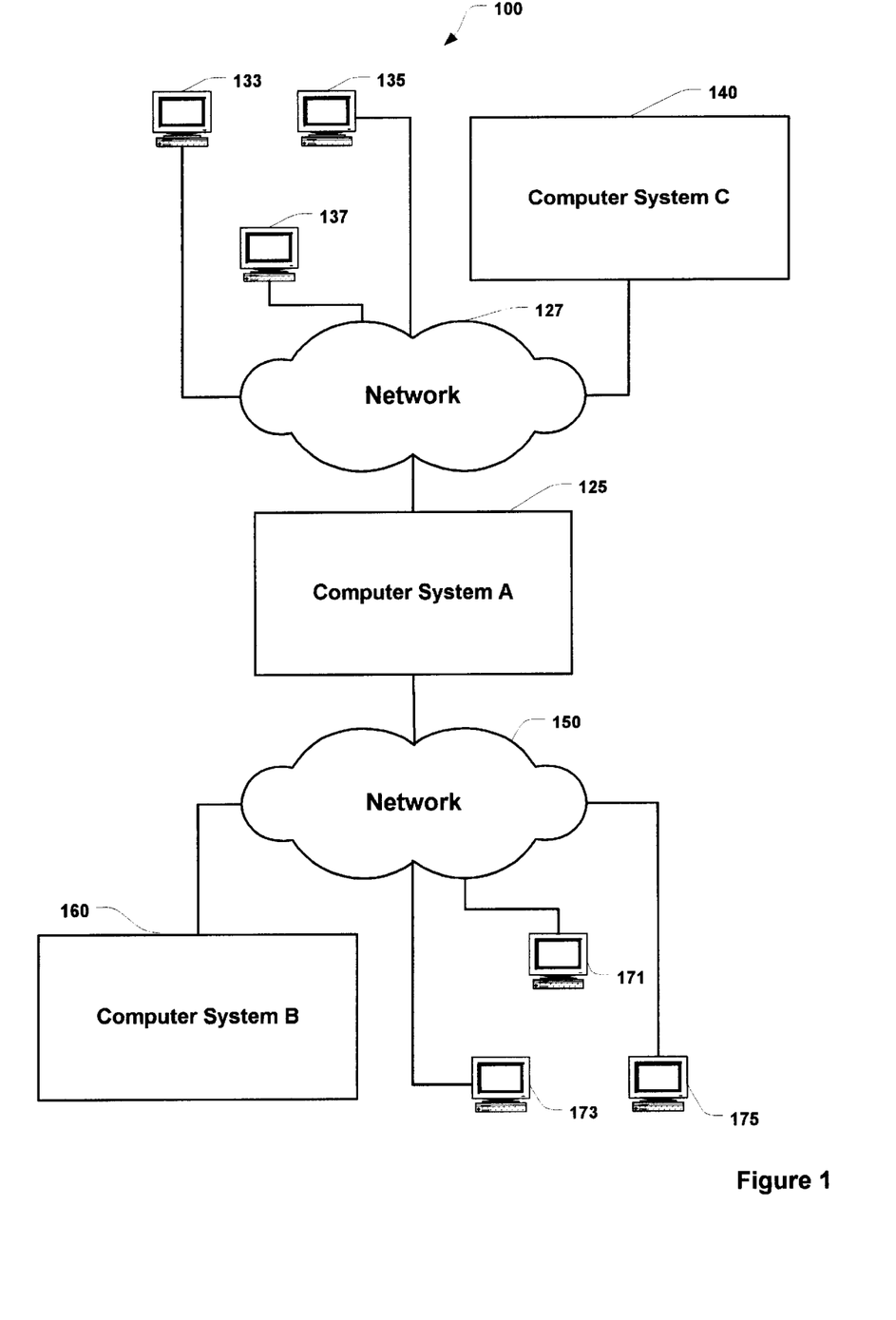
FIG. 1 is a schematic diagram showing a computing system running the present invention.
Figure 1A:
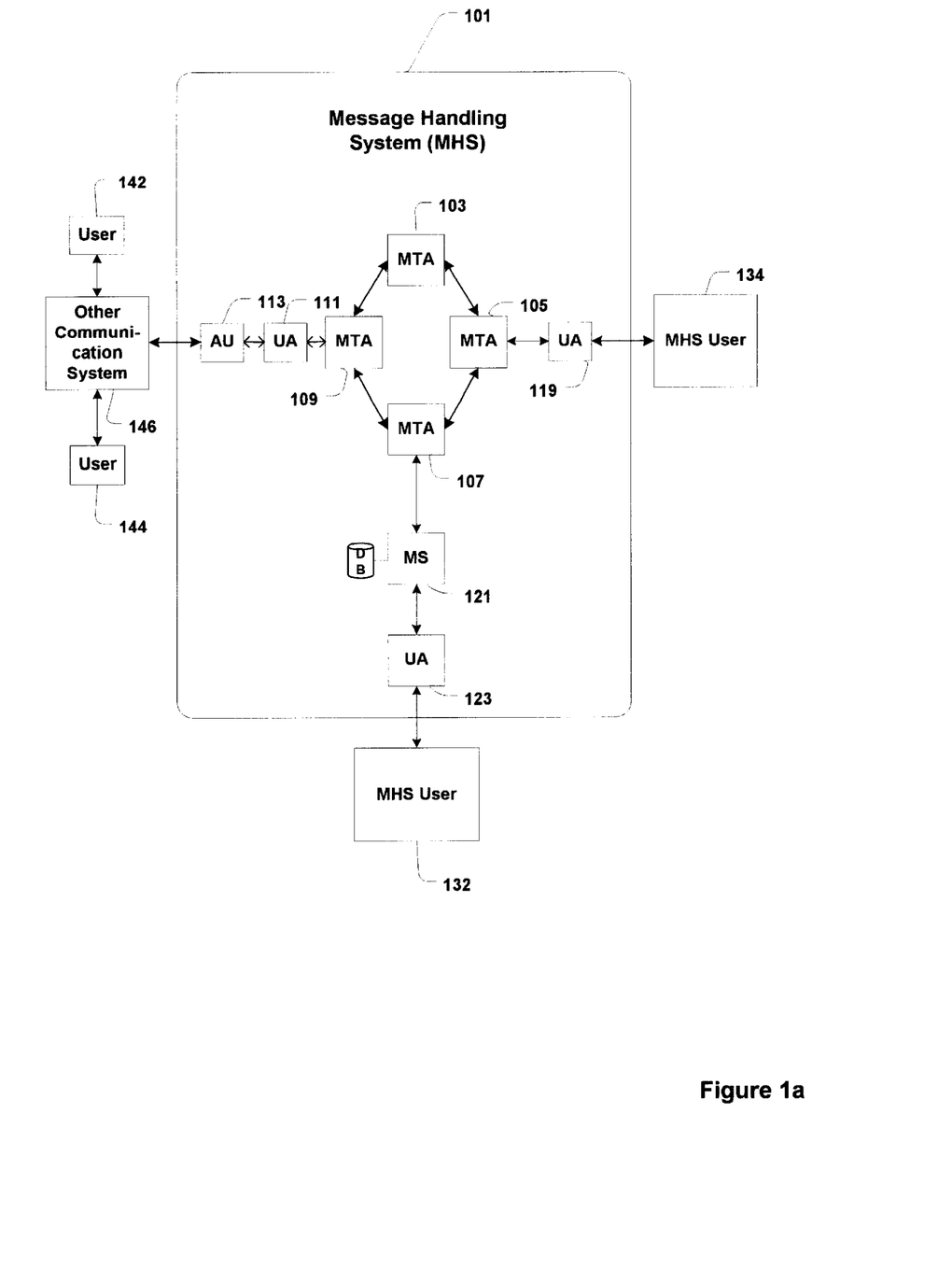
FIG. 1a is a block diagram of an exemplary message handling system in accordance with the present invention.

FIGS. 1 and 1a show computing system 100 running an X.400 compliant message handling system (MHS) 101. Computing system 100 has several computer systems 125, 140, and 160. Computer systems 125, 140, and 160 are electronically coupled to each other through networks 127 and 150. Further, FIG. 1 shows stand alone computers 133, 135, and 147, and 173, 175, and 177. These stand alone computers are electronically coupled to computer systems 125, 140, and 160 through networks 127 and 150. The X.400 compliant message handling system 101 performs various message processing, including message creation, routing, and storage, among the various computers 133, 135, 137, 173, 175, and 177 and computer systems 125, 140, and 160.

FIG. 1a shows illustrative components of MHS 101. MHS 101 may contain several message transfer agents (MTA) 103, 105, 107 and 109 which cooperate with user agents (UA) 111 or 119 or message store (MS) 121. Further, MS 121 may communicate with UA 123. MTAs 103,105, 107, and 109 may be capable of receiving messages designated for local delivery (i.e. local to the MTA, such as, to UA 119, MS 121, or AU 113 through UA 111) for local processing and routing messages designated for other MHS components (remote MTAs) to those MHS components. Additionally, MTAs 103, 105, 107, and 109 may communicate with access unit (AU) 113 through UA 111. AU 113 is a MHS component which acts to facilitate processing with another communication or computer system 146. Computer or communication system 146 may cooperate with users 142 and 144 as part of message handling. Further, FIG. 1a shows MHS 101 cooperating with MHS users 132 and 134. In the context of computing system 100, MHS 101 components may reside in various combinations on computers 133, 135, 137, 173, 175, and 177, and computer systems 125, 140, and 160 and cooperate over networks 127 and 150, of FIG. 1.

Figure 2:
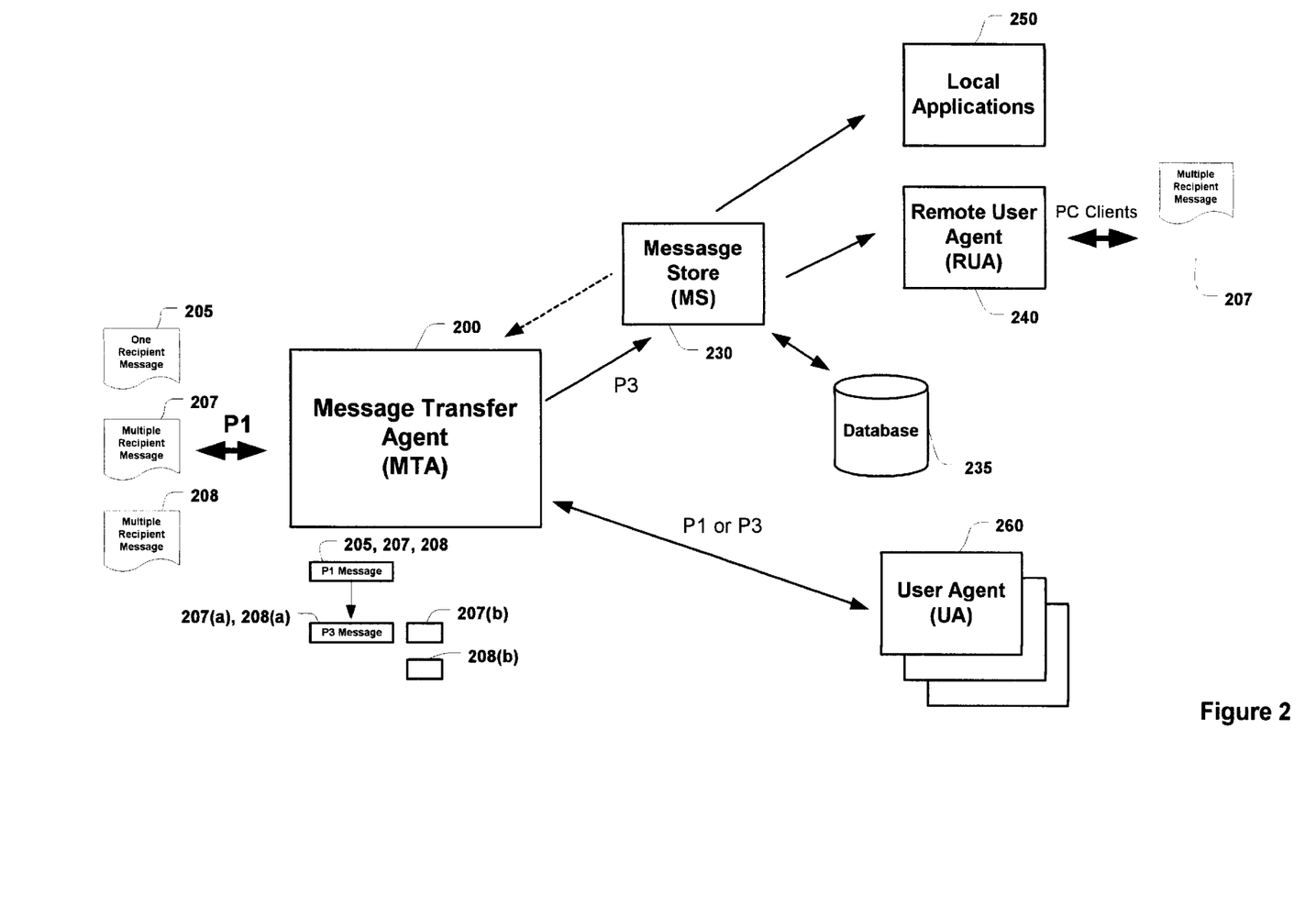
FIG. 2 is a block diagram of the components of an illustrative message handling system (MHS) in accordance with the present invention.

FIG. 2 shows how messages are handled by MHS 101. There are several message formats that messages 205, 207, and 208 may maintain so as to cooperate with various MHS 101 components. For example, messages 205, 207, and 208 that are communicated to and from message transfer agent (MTA) 200 maintain the P1 message format. However, to process messages in the MHS 101, the MS MHS component 230 requires messages to be formatted in the P3 message format. Correspondingly, messages 205, 207, and 208 that are received by the MTA 200 that are subsequently transferred to MS 230 require translation from the illustrative P1 message format to the illustrative P3 message format. FIG.

2 further shows MS 230 having a database 235 which is used by MS 230 store information about messages 205, 207, and 208 that may be received by MS 230. Moreover, MS 230 cooperates with other MHS 101 components when processing messages 205, 207, and 208 including local application 250, remote user agent (RUA) 240, MS 230, UA 260, and AU 113. Local application 250 and RUA 240 may receive and provide information about messages processed by MHS 101, whereas MS 230, UA 260, and AU 113 (of FIG. 1a) are used to deliver messages to the listed recipients.

Depending on the message origin and destination, the operation of MHS 101 may differ. For purposes of this example, it is assumed that messages are being received by MTA 200 to be routed locally to local MHS components (i.e. MS 230, UA 260, local applications 250, or RUA 240). However, as indicated by FIG. 2, a message (for example, message 207) may originate from a user through a PC client for handling by MHS 101. The message may be routed to other cooperating MHS components or to another MHS.

During operation, MTA 200 may receive, process, and transfer a number of messages, such as, messages 205, 207, and 208. The messages received by MTA 200 may have single recipients, such as, message 205 or multiple recipients, such as, messages 207 and 208. MTA 200 will process messages 205, 207, and 208 according to the listed recipients. For example, MTA 200 may deliver the message to MHS components associated with the listed recipients, such as, local application 250, RUA 240, UA 260, or MS 230. As part of message processing, MTA 200 reads incoming messages 205, 207, and 208 to determine the message recipients and to ascertain the type of processing required for the received message to successfully route the message to its listed recipients. For example, the message may require translation if a listed recipient is associated with a MHS component requiring a specific message. MTA 200 will recognize that the message needs translation from a first message format to a second message format and perform the appropriate processing for each of the listed recipients for each message received and cooperates with appropriate MHS components to realize message delivery.

Improved Storage Method Description

FIG. 2 further shows show the processing that MHS 101 performs to realize more efficient and non-redundant processing of multiple recipient messages. Depending on the number of listed message recipients and the destination of these recipients, MTA 200 may perform different processing. In the case of single message recipients, MTA 200 processes the message and transfers it to the intended MHS component. When processing multiple recipient messages, such as, messages 207 and 208, MTA 200 processes the message for each of the recipients listed on messages 207 and 208. When there are multiple recipients listed in a message, such as, messages 207 or 208, intended for MHS components requiring translation, such as, MS 230, MTA 200 translates the message and stores copy of the multiple recipient translated message 207(a) or 208(a) locally. Accordingly, MTA 200 may then create a reference pointer, 207(b) or 208(b) for the translated message that associates the translated message with the original message and its recipients. The multiple recipient message, 207 or 208, is then processed for delivery to the appropriate MHS component. In the event that there are multiple recipients intended for a MHS component requiring translated message formats, such as, MS 230, MTA 200 will send the translated message for the first listed recipient in need of translation. The translated message may be received by the intended MHS component where it may be stored in a database, such as, database 235. The cooperating MHS component then creates a unique and persistent message identifier which is associated with the translated message. This message identifier is stored local to the cooperating MHS component and is communicated back to MTA 200. MTA 200 associates the received message identifier with the created reference pointer 207(b) or 208(b) which is used in processing the next listed recipient intended for the same MHS component. Through the use of the message identifier and reference pointer, multiple recipient messages may be processed by performing a single translation and transfer of the processed message.

Improved Storage Processing

Figure 3:
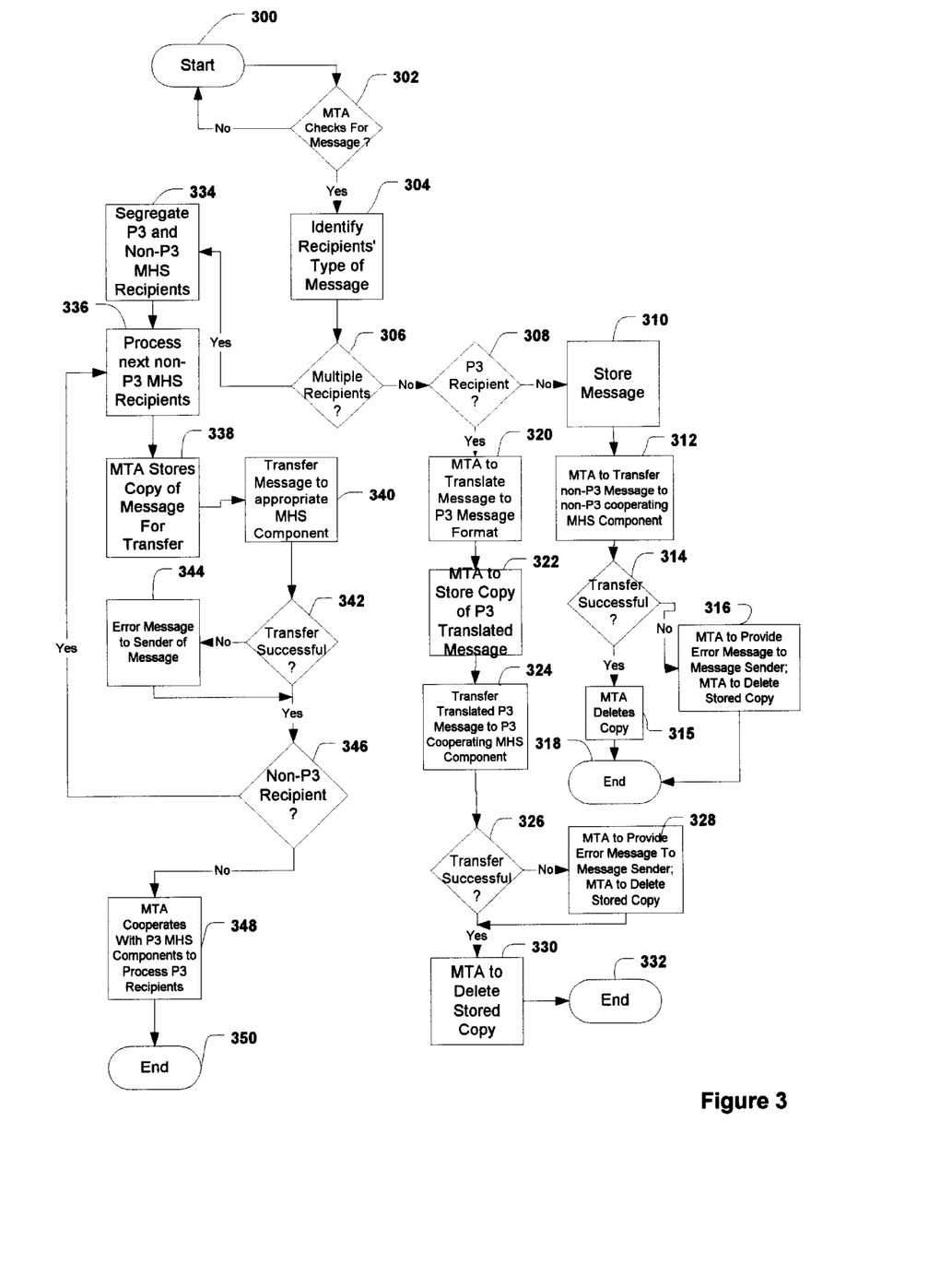
FIG. 3 is a flowchart illustrating the processing performed by an illustrative MHS in accordance with the present invention.
Figure 4:
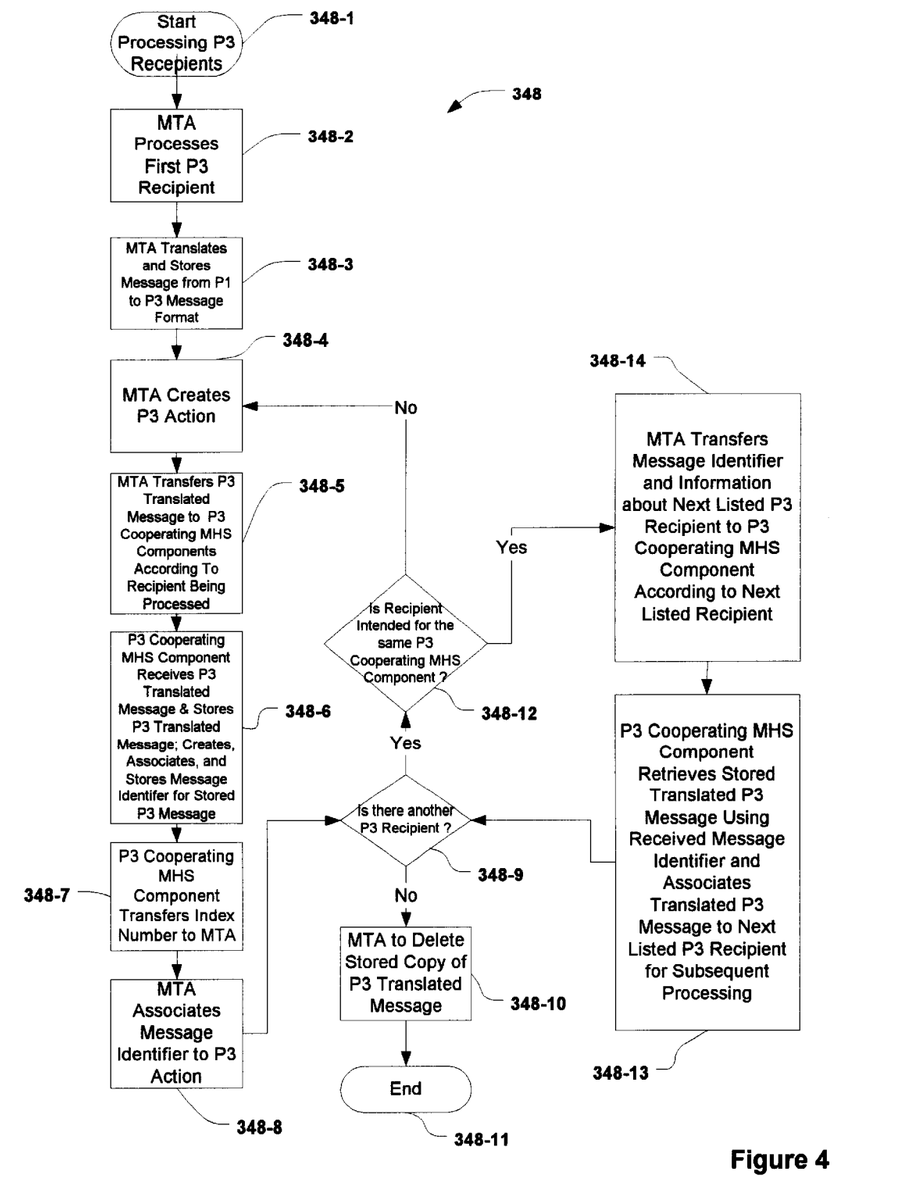
FIG. 4 is a more detailed flowchart of FIG. 3 showing processing performed by the present invention.

FIGS. 3 and 4 with reference to FIGS. 1, 1a, and 2 show the processing preformed by the various components of the MHS to realize improved message storage. MHS 101 processing starts at block 300 and proceeds to block 302 where a check is performed by MTA 200 to see if new messages have been received. If there are no messages, processing loops until there is new message. When a new message, such as, message 205, 207, or 208, is detected by MTA 200, processing proceeds to block 304 where MTA 200 identifies the recipients of the message. That is, MTA 200 determnines whether the recipient(s) of the message require(s) translation as part of its processing. A check is then undertaken at block 306 by MTA 200 to determine if there are multiple recipients of the received message. If the message is not a multiple recipient message, MTA 200 performs a check at block 308 to determine whether the single recipient of the message is associated with a MHS component requiring translation. If the message requires translation, MTA 200 translates the message from the P1 message format to the P3 message format at block 320. MTA 200 then stores a copy of the translated message at block 322. The translated message is then transferred to the recipient intended MHS component at block 324 (e.g. MS 230 or UA 260). MTA 200 then checks to see if the transfer was successful at block 326. If it is successful, MTA 200 deletes the stored copy of the translated message. Processing for the received message then ends at block 332. However, if the transfer of block 324 is unsuccessful, MTA 200 provides an error message at block 328 to the original message sender that the message delivery was unsuccessful. In addition, MTA 200 deletes the copy of the received message at block 328.

However, if at block 308, MTA 200 determines that the message does not require translation, MTA 200 stores the received message at block 310 and proceeds to transfer the message to the intended MHS component that is associated with the listed message recipient at block 312. MTA 200 then checks to see if the transfer to the MHS component that doesn't require translation was successful. If it is successful, MTA 200 deletes the stored copy of the translated message at 315. Processing for the received message then ends at block 318. However, if the transfer is unsuccessful MTA 200 provides an error message at block 316 to the original message sender that the message delivery was unsuccessful. In addition, MTA 200 deletes the copy of the received message at block 316. Processing then ends at block 318.

FIG. 3 further shows that if the check performed by MTA 200 at block 306 indicates a message as having multiple recipients, MTA 200 processes the recipient list found in the received message at block 334 to demarcate those recipients requiring translation from those recipients that do not require translation. MTA 200 then processes the first recipient that does not require translation at block 336. MTA 200 stores a copy of the received multiple recipient message at block 338 and transfers the message at block 340 to the MHS component associated with the first recipient not requiring translation. MTA 200 then checks to see if the transfer was successful at block 342. If the transfer is successful, MTA 200 checks the received message to see if there are any additional recipients that do not need translation at block 346. If the contrary is true, that is, the transfer was not successful, MTA 200 produces an error message to the sender of the message to indicate that the message was not successfully delivered and proceeds to block 346. If the result of the check performed at block 346 indicates additional recipients that do not need translation, MTA 200 proceeds to block 336 where processing continues therefrom. However if the check at block 306 indicates that there are no more recipients that require translation, MTA 200 proceeds to block 348 and begins to process those recipients that do require translation. Once all of those recipients have been processed for the message received, MHS processing ends at block 350.

FIG. 4 illustrates the processing by block 348 of FIG. 3. That is, processing performed by MHS 101 when processing those recipients of a multiple recipient message that require translation. FIG. 4 shows that processing beings at block 348-1 and proceeds to block 348-2 where MTA 200 processes the first recipient requiring translation. MTA 200 then translates the message at block 348-3 from the received message format, such as, P1, to a message format that the processed message recipient requires for delivery, such as, P3. In addition, MTA 200 stores a copy of the translated message locally at block 348-3. MTA 200 proceeds to create a processing action at block 348-4. The processing action is associated with the translated message and acts as a pointer between the translated message and cooperating MHS components. MTA then transfers the translated message and information about the first processed recipient at block 348-5 to the appropriate MHS component associated with the first recipient. From there, the cooperating MHS component receives the translated message and information about the first processed recipient at block 348-6. In addition, the cooperating MHS component stores the translated message in a database local to the MHS component and proceeds to create and store a unique and persistent message identifier that is associated with the received translated stored message. The cooperating MHS component transfers the newly created message identifier back to MTA 200 at block 348-7. MTA 200 receives the message identifier and associates the received message identifier to the created processing action at block 348-8. From there, MTA 200 checks the processed message at block 348-9 to see if there are additional recipients that require translation. If there are no additional recipients that require processing, MTA 200 proceeds to block 348-10 where MTA 200 deletes the stored copy of the translated message and processing ends at block 348-11. However, if the contrary is true, MTA performs a check to see if the next processed recipient is intended for the same cooperating MHS component. If the recipient is intended for a different MHS component, MTA proceeds to block 348-4 and processing continues therefrom. However, if the next processed recipient of the received message is intended for the same cooperating MHS component, MTA 200 transfers the message identifier received from the cooperating MHS component and information about the next processed recipient to the cooperating MHS component at block 348-14. The cooperating MHS component receives the message identifier and the information about the next processed recipient at block 348-13 and retrieves the stored translated message using the message identifier. The retrieved translated message is then associated with the next processed recipient. Processing then reverts to block 348-9 where the MTA checks to see if there is another recipient that needs to be processed that requires translation. Processing proceeds therefrom.

Conclusion

In sum, the present invention provides a system and process for improved message storage for a message handling system, improving processing efficiency and removing redundancy for components processing messages that have multiple recipients that require translation. It is understood, however, that the invention is susceptible to various modifications and alternative constructions. There is not intention to limit the invention to the specific constructions, such as, the X.400 message handling system (MHS) described herein.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention as defined in the following claims.

What is claimed is:

1. In a computer system maintaining a message handling system (MHS) in accordance with an MHS standard, a method for improved message storage, comparing the acts of:

(a) translating a message received by a first MHS component from a first message format to a second message format, and storing a copy of said translated message; and (b) transferring a copy of the translated message to a second MHS component cooperating with said first MHS component, said second MHS component creating an association for said translated message to facilitate use of said translated message, wherein said creating tan association includes creating a unique message identifier.

2. A method as recited in claim 1, wherein the message received by the first MHS component indicates a first recipient having a routing association with said second MHS component, wherein the copy of the the message is transferred to said second MHS component for said first recipient, and wherein said identifier is further associated with said first recipient.

3. A method as recited in claim 2, farther comprising storing said translated message alone with said identifier in a database coupled to said second MHS component.

4. A method as recited in claim 1, wherein said MHS standard is the X.400 MHS standard.

5. A method as recited in claim 1, further comprising communicating said unique message identifier from the second MHS component to said first MHS component.

6. A method as recited in claim 5, further comprising associating the communicated identifier with said copy of said translated message in said first MHS component.

7. A method as recited in claim 6, further comprising transferring information, including said message identifier, about a next listed recipient having a routing association to said second MHS component.

8. A method as recited in claim 7, further comprising retrieving said transferred translated message from the database using said translated message association and associating it with said second recipient.

9. A computer-readable medium having computer-executable instructions for instructing a copter in performing acts on a computing system maintaining a message handling system (MHS) in accordance with a preferred MHS standard, said acts comprising:

(a) translating a message received by a first MHS component from a first message format to a second message format, and storing a copy of said translated message; and, (b) transferring a copy of the translated message to a second MHS component, said second MHS component creating an association for said translated message to facilitate use of said translated message, wherein said translated message association includes a message identifier.

10. The computer-readable medium as recited in claim 9, wherein the message received by the first MHS component indicates a first recipient having a routing association with said second MHS component, wherein the copy of the translated message is transferred to said second MHS component for said first recipient, and wherein said message identifier is further associated with said first recipient.

11. The computer-readable medium as recited in claim 9, further comprising storing said translated message along with said unique message identifier in a database coupled to said second MHS component.

12. The computer-readable medium as recited in claim 9, wherein said MHS standard is the X.400 MHS standard.

13. The computer-readable medium as recited in claim 9, wherein said identifier comprises an index number.

14. The computer-readable medium recited in claim 13, further comprising communicating said message identifier from the second MHS component to said first MHS component.

15. The computer-readable medium recited as in claim 14, further comprising associating said communicated message identifier with said copy of said translated message in said first MHS component.

16. The computer-readable medium recited as in claim 15, further comprising transferring information, including said message identifier, about a next listed recipient having a routing association to said second MHS component.

17. The computer-readable medium recited as in claim 16, further comprising retrieving said transferred translated message from the database using said translated message association and associating it with said second recipient.

18. In a computing system maintaining a message handling system (MHS) in accordance with an MHS standard, an apparatus for providing efficient translation and transfer of formatted messages, comprising a first MHS component; and, a second MHS component operatively coupled to the first MHS component, wherein the first MHS component receives a message having information relevant to a plurality of message recipients including message recipients associated with said second MHS component translates said message for said message recipients associated with said second MHS component, stores a copy of said translated message, and cooperates with said second MHS component to route said message to said message recipients, and, wherein said second MHS component creates associations for said translated messages to facilitate use of said translated message, said associations including a unique and persistent message identifier which is associated with each said translated message and said message recipients associated with said second MHS component.

19. The apparatus as recited in claim 18, wherein a copy of the translated message is transferred to he said second MHS component for a first recipient whose routing association, as set forth in the message received by the first MHS component, indicates routing to said second MHS component.

20. The apparatus as recited in claim 18, further comprising storing said translated messages in a database coupled to said second MHS component.

21. The apparatus as recited in claim 20, wherein said message identifier is stored along with si translated message in said database.

22. The apparatus as recited in claim 18, wherein said MHS standard is the X.400 MHS standard.

23. The apparatus as recited in claim 18, further comprising communicating said unique and persistent message identifier from the second MHS component to said first MHS component.

24. The apparatus as recited in claim 23, further comprising associating said communicated unique and persistent message identifier to said copy of said translated message in said fist MHS component.

25. The apparatus as recited in claim 24, further comprising transferring information, including said unique and persistent message identifier, about a next listed recipient having a routing association to said second MHS component.

26. The apparatus as recited in claim 25, further comprising retrieving said transferred translated message from the database using said translated message association and associating it with said second recipient.

* * * * *